United States Patent
Olszweski et al.

(10) Patent No.: US 7,713,130 B2
(45) Date of Patent: May 11, 2010

(54) TRIPOD-ROLLER

(75) Inventors: Piotr Olszweski, Hagucnau (FR); Wolfgang Crackau, Magdeburg (DE)

(73) Assignees: IFA-Technologies GmbH Haldersleben, Haldensleben (DE); Schaeffler KG, Herzogenaurach (DE)

( * ) Notice: Subject to any disclaimer, the term of this patent is extended or adjusted under 35 U.S.C. 154(b) by 310 days.

(21) Appl. No.: 11/667,220

(22) PCT Filed: Oct. 29, 2005

(86) PCT No.: PCT/EP2005/011618
§ 371 (c)(1), (2), (4) Date: Aug. 2, 2007

(87) PCT Pub. No.: WO2006/050833
PCT Pub. Date: May 18, 2006

(65) Prior Publication Data
US 2008/0026856 A1    Jan. 31, 2008

(30) Foreign Application Priority Data
Nov. 9, 2004  (DE) ............. 10 2004 054 267

(51) Int. Cl.
*F16D 3/205* (2006.01)
(52) U.S. Cl. .................. 464/111; 464/132
(58) Field of Classification Search ........ 464/111, 464/132, 905; 384/564, 584, 585
See application file for complete search history.

(56) References Cited

U.S. PATENT DOCUMENTS

| 2,054,582 | A | * | 9/1936 | Delaval-Crow |
| 4,257,655 | A | | 3/1981 | Mirring |
| 4,657,414 | A | * | 4/1987 | Stella ............. 384/564 X |
| 5,167,583 | A | | 12/1992 | Bensinger et al. |
| 5,376,049 | A | * | 12/1994 | Welschof et al. ....... 464/111 |
| 5,797,798 | A | * | 8/1998 | Bastien et al. ......... 464/111 |
| 6,478,682 | B1 | | 11/2002 | Kura et al. |

FOREIGN PATENT DOCUMENTS

| DE | 43 40 458 | 6/1995 |
| DE | 93 21 255 | 11/1996 |
| DE | 198 40 336 | 3/2000 |
| EP | 0 426 186 | 5/1991 |
| FR | 2 738 881 | 3/1997 |
| GB | 2 199 621 | 7/1988 |

* cited by examiner

Primary Examiner—Greg Binda
(74) Attorney, Agent, or Firm—Jordan and Hamburg LLP

(57) ABSTRACT

Tripod roller for a constant velocity joint in a tripod construction having an interior ring, an exterior ring, and roller bodies arranged therebetween, whereby provided on the interior and on the exterior ring are two mutually opposing annular shoulders that limit the axial movement of the roller bodies in one direction. One of the rings has another annular shoulder for limiting the axial movement of the roller bodies in the other direction, while other ring is axially extended and has a circumferential annular groove in which is received a radially projecting locking ring that laterally overlaps the one ring.

5 Claims, 1 Drawing Sheet

TRIPOD-ROLLER

FIELD OF THE INVENTION

The invention relates to a tripod roller for a constant velocity joint in a tripod construction, having an interior ring, an exterior ring, and roller bodies arranged therebetween.

BACKGROUND OF THE INVENTION

Such a tripod roller or a constant velocity joint constructed with such a tripod roller is known e.g. from EP 0 426 186 B1. Such constant velocity joints are used for instance in all drive shafts in front wheel-drive passenger vehicles. They have a rotatable exterior joint part with three circumferentially distributed raceway devices, each of which has two parallel, flat running faces, as well as a tripod star that the joint exterior part wraps around and that has three circumferentially distributed radial journals, whereby each of the journals is received in the interior ring of a tripod roller.

The tripod roller that is described in EP 0 426 186 B1 provides an exterior ring and an interior ring, between which the roller bodies are arranged. At one end, the interior ring has an integral, outwardly projecting projection on which the exterior ring is borne on its first end face. Arranged at the opposing end of the roller unit is a disk and a locking ring via which the roller unit is held together. The disk sits outside on the interior ring, and the exterior ring is placed thereupon with its second end face and with no clearance. The locking ring is received in a groove embodied on the interior ring and overlaps the disk such that no axial movement of the interior ring is possible relative to the exterior ring. The roller bodies that are received between interior ring and exterior ring with minimum axial clearance are guided at their end faces on the projection of the interior ring or of the disk. Although this multi-part design of the tripod roller does serve its purpose, four parts are required in addition to the roller bodies, which is disadvantageous in terms of assembling the roller and in terms of production costs.

SUMMARY OF THE INVENTION

The underlying problem of the invention is to provide a tripod roller that is simplified in terms of construction and in which an axial movement of the roller body is limited and at the same time in which the roller is secured overall using only a few components.

For solving this problem, in a tripod roller of the type cited in the foregoing it is inventively provided that provided on the interior ring and on the exterior ring are two mutually opposing annular shoulders that limit an axial movement of the roller bodies in the one direction, and it is provided that one of the rings has another annular shoulder for limiting the axial movement of the roller bodies in the other direction, while the other ring is axially extended and has a circumferential annular groove in which is received a radially projecting locking ring that laterally overlaps the one ring.

In the inventive tripod roller, apart from the roller bodies only three components are used, specifically the interior ring, the exterior ring, and the locking ring. An axial movement is attained using the two mutually opposing annular shoulders, which are provided projecting radially outward on the interior ring or projecting radially inward on the exterior ring. The axial movement in the other direction is limited using an additional annular shoulder on one of the rings, while fixation of the rollers overall occurs using the locking ring, which renders it impossible to pull the interior ring out of the exterior ring. The result is thus a simple construction in which the roller bearings are secured axially, while simultaneously with a corresponding arrangement of the shoulders and the locking ring there is slight axial mobility of the interior ring.

The additional annular shoulder can be provided on the exterior ring, while the interior ring is axially extended and has the annular groove that is open outward and in which the locking ring is arranged that overlaps the end face of the exterior ring. Alternatively, this configuration can also be reversed, that is, the additional annular shoulder is provided on the interior ring, it projects radially outward, while the exterior ring is axially extended and the annular groove that is embodied open inward on its interior wall has the locking ring.

In order to configure the tripod roller as compactly and as small in the axial direction as possible, it is useful when the mutually opposing annular shoulders are provided on the edge of the respective ring.

In addition to the tripod roller, the invention furthermore relates to a constant velocity joint in a tripod construction comprising an exterior joint part and an interior joint part that are coupled to one another via a plurality of tripod rollers of the type described.

BRIEF DESCRIPTION OF THE DRAWINGS

Additional advantages, features, and details of the invention result from the exemplary embodiment described in the following and using the drawings.

DETAILED DESCRIPTION OF THE DRAWINGS

Figure 1:
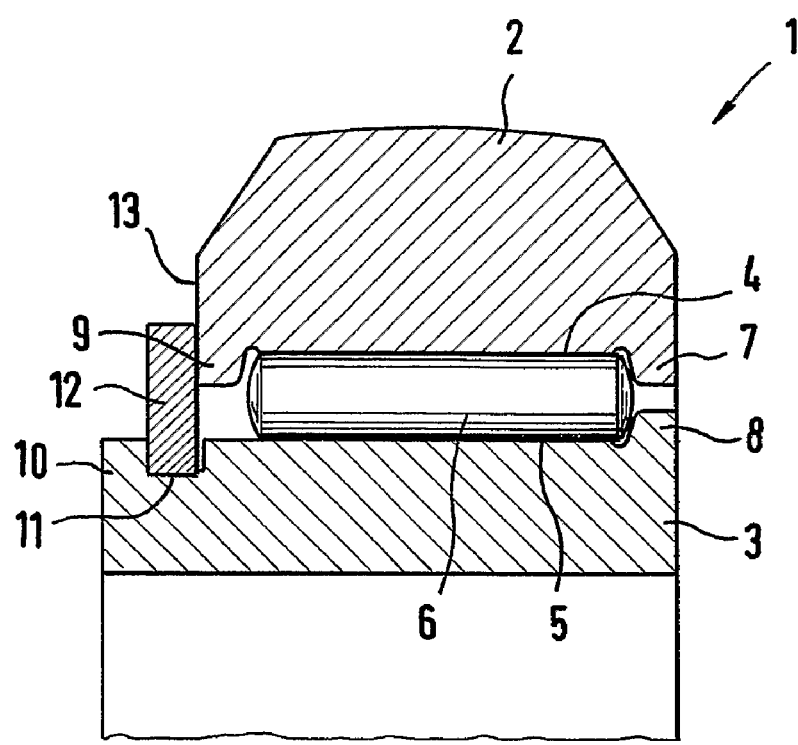
FIG. 1 is an inventive tripod roller in a first embodiment.

FIG. 1 is a partial sectional view of an inventive tripod roller 1, comprising an exterior ring 2 and an interior ring 3 as well as roller bodies 6, in the form of needles, that run therebetween on corresponding running faces 4, 5. The axial movement of the roller bodies 6 to the right side in terms of FIG. 1 is realized using two mutually opposing annular shoulders, the one annular shoulder 7 being arranged on the edge of the exterior ring 2 and projecting radially inward, while the second annular shoulder 8 is provided on the edge of the interior ring 3, projecting radially outward. Both shoulders are spaced somewhat apart from one another. Their interior contour is approximately consistent with the spherical end face of the roller bodies 6.

The axial mobility of the roller bodies 6 to the left, relative to FIG. 1, is limited via another annular shoulder 9 that is provided on the edge of the exterior ring 2, projecting radially inward. As FIG. 1 illustrates, a certain free space remains between the end face of the roller bodies 6 and the support surface of the annular shoulder 9 so that a slight axial displacement of the roller bodies 6 is possible, and thus also of the interior ring 3 relative to the exterior ring 2.

It can furthermore be seen that the interior ring 3 is wider than the exterior ring, that is, it overhangs the exterior ring 2 in the axial direction. Provided in this projection area 10 is an annular groove 11 in which a locking ring 12 is received or snapped in. The latter stands apart outwardly and overlaps the exterior ring 2 on its edge side 13. This is how the tripod roller is held together overall. Because a possible movement of the interior ring 3 with respect to the exterior ring 2 is limited in every case via the roller bodies 6 that strike one or the other annular shoulder 7, 8, 9.

For assembling the tripod roller, initially the roller bodies are placed in the exterior ring 2, whereupon the interior ring 3 is inserted. Then the locking ring 12 is snapped into the annular groove 11.

Figure 2:
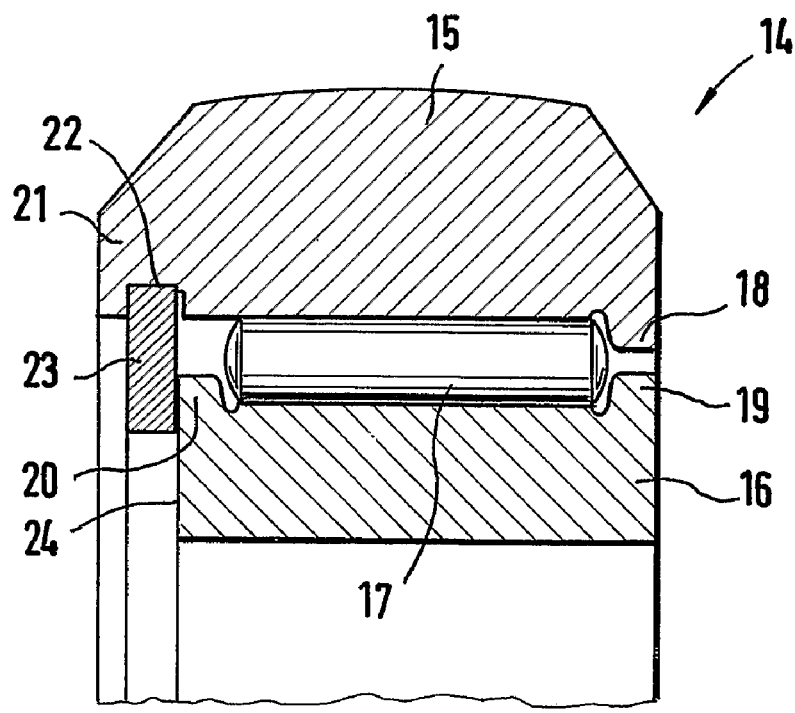
FIG. 2 is an inventive tripod roller in a second embodiment.

FIG. 2 depicts an alternative embodiment of an inventive tripod roller 14. It also comprises an exterior ring 15 and an interior ring 16 and roller bodies 17 in the form of needles arranged therebetween. As shown to the right in FIG. 2, the exterior ring has an annular shoulder 18 and the interior ring has an annular shoulder 19 that are arranged mutually opposing one another and that limit roller body movement. In contrast to the embodiment in accordance with FIG. 1, in this case the additional annular shoulder 20 is provided on the interior ring 16, and in this case the roller body is also somewhat shorter than the two annular shoulders 19, 20 are spaced apart from one another. The exterior ring 15 projects in the axial direction and in the projection area 21 has an annular groove 22 into which the locking ring 23 has been snapped. The latter overlaps the end face 24 of the interior ring 16. In this case, as well, the roller is completely fixed once the locking ring 23 has been placed, and the movement of the roller bodies [sic] 18 is limited on both sides via the annular shoulders 18, 19, 20. Again, a certain amount of clearance is provided, that is, the interior ring 16 can be moved slightly in relation to the exterior ring 15.

LEGEND

Tripod roller
Exterior ring
Interior ring
Running face
Running face
Roller body
Annular shoulder
Annular shoulder
Annular shoulder
Projection area
Annular groove
Locking ring
Edge side
Tripod roller
Exterior ring
Interior ring
Roller body
Annular shoulder
Annular shoulder
Annular shoulder
Projection area
Annular groove
Locking ring
End face

The invention claimed is:

1. Tripod roller for a constant velocity joint in a tripod construction, comprising:
    an interior ring;
    an exterior ring;
    roller bodies arranged between the interior and exterior rings; and
    a radially projecting locking ring, two mutually opposing annular shoulders on said interior ring and on said exterior ring limiting axial movement of said roller bodies in one direction, one of said rings having another annular shoulder for limiting the axial movement of said roller bodies in the other direction, said other ring being axially extended and having a circumferential annular groove in which said radially projecting locking ring is received, said locking ring laterally overlapping said one ring, and said another annular shoulder defining a contact face which is spaced from said roller bodies and said two mutually opposing annular shoulders to define a spaced area therebetween, said roller bodies being axially movable within said spaced area.

2. Tripod roller in accordance with claim 1, wherein said additional annular shoulder is provided on said exterior ring said interior ring being axially extended and having said annular groove with said locking ring.

3. Tripod roller in accordance with claim 1, wherein said additional annular shoulder is provided on said interior ring, said exterior ring being axially extended and having said annular groove with said locking ring.

4. Tripod roller in accordance with claim 1, wherein said mutually opposing annular shoulders are provided on the edge of the respective ring.

5. Constant velocity joint in a tripod construction, comprising:
    an exterior joint part; and
    an interior joint part, each of the exterior and interior joint parts being coupled to one another via a plurality of tripod rollers in accordance with claim 1.

* * * * *